US012608988B2

(12) United States Patent
    Boulos et al.

(10) Patent No.: US 12,608,988 B2
(45) Date of Patent: Apr. 21, 2026

(54) WIRELESS HANDHELD BEACON DEVICE FOR BUILDING MANAGEMENT

(71) Applicant: Kimberly-Clark Worldwide, Inc., Neenah, WI (US)

(72) Inventors: Jonathan D. Boulos, Appleton, WI (US); Galdric Marcotte, Alpharetta, GA (US); Vannarak DeMonteiro, Suwanee, GA (US); Shawn J. Sullivan, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 18/547,358

(22) PCT Filed: Mar. 31, 2021

(86) PCT No.: PCT/US2021/025052
    § 371 (c)(1),
    (2) Date: Aug. 22, 2023

(87) PCT Pub. No.: WO2022/211795
    PCT Pub. Date: Oct. 6, 2022

(65) Prior Publication Data
    US 2024/0127651 A1      Apr. 18, 2024

(51) Int. Cl.
    *G07C 9/22*      (2020.01)
    *G01S 1/04*      (2006.01)
    *G07C 9/00*      (2020.01)
(52) U.S. Cl.
    CPC ............... *G07C 9/22* (2020.01); *G01S 1/042* (2013.01); *G07C 9/00309* (2013.01);
    (Continued)
(58) Field of Classification Search
    None
    See application file for complete search history.

(56) References Cited

U.S. PATENT DOCUMENTS

| | | | |
|---|---|---|---|
| 5,575,515 A | 11/1996 | Iwamoto et al. | |
| 6,067,018 A | 5/2000 | Skelton et al. | |
| | (Continued) | | |

FOREIGN PATENT DOCUMENTS

| | | |
|---|---|---|
| CN | 108541324 A | 9/2018 |
| CN | 110473318 A | 11/2019 |
| | (Continued) | |

OTHER PUBLICATIONS

PCT Search Report Corresponding to Application No. PCT/US2021/025052 on Aug. 2, 2021.

(Continued)

*Primary Examiner* — Muhammad Adnan
(74) *Attorney, Agent, or Firm* — Dority & Manning, P.A.

(57)      ABSTRACT

A key can be configured for interfacing with a dispenser in a commercial facility, the key can include a body and key hardware configured to unlock the dispenser. A beacon device can be incorporated into the body and configured to transmit beacon data including an identity of the beacon device. The key can be used for maintenance of commercial facilities by maintenance personnel, wherein the commercial facilities include consumable product dispensers that require periodic refill. Maintenance can include interfacing a receiver device incorporated in a product dispenser with a beacon device incorporated into a key configured to unlock the product dispenser, interfacing the receiver device with a server system to transmit the identity of the beacon device to the server system, and identifying, by the server system, an identity of a maintenance personnel that unlocks the product dispenser based at least in part on the identity of the beacon device.

15 Claims, 6 Drawing Sheets

(52) U.S. Cl.
CPC ................... *G07C 9/00896* (2013.01); *G07C 2009/00793* (2013.01); *G07C 2009/00992* (2013.01)

(56) References Cited

U.S. PATENT DOCUMENTS

| | | | | |
|---|---|---|---|---|
| 7,154,397 | B2 * | 12/2006 | Zerhusen | A61G 7/0507 340/286.07 |
| 8,074,481 | B2 * | 12/2011 | Bass | G07C 9/00944 70/456 R |
| 8,160,742 | B2 | 4/2012 | Goerg et al. | |
| 9,652,955 | B1 * | 5/2017 | Ray | H04W 4/023 |
| 9,659,481 | B2 | 5/2017 | Himmelmann et al. | |
| 9,741,233 | B2 | 8/2017 | Laufer et al. | |
| 9,920,553 | B2 * | 3/2018 | Limbert | E05B 35/002 |
| 10,066,379 | B2 | 9/2018 | Schomburg et al. | |
| 10,403,121 | B2 | 9/2019 | Liu et al. | |
| 10,496,961 | B2 | 12/2019 | Ophardt et al. | |
| 11,010,714 | B2 * | 5/2021 | Li | G06Q 30/02 |
| 11,272,815 | B2 * | 3/2022 | Rospierski | A47K 5/1217 |
| 11,354,628 | B2 * | 6/2022 | Ophardt | G06Q 10/087 |
| 11,903,537 | B2 * | 2/2024 | Rospierski | A47K 5/1217 |
| 2005/0127090 | A1 * | 6/2005 | Sayers | B41J 2/17546 222/1 |
| 2005/0171634 | A1 * | 8/2005 | York | G07F 11/68 700/231 |
| 2006/0124662 | A1 * | 6/2006 | Reynolds | A47K 5/1217 222/23 |
| 2009/0101751 | A1 * | 4/2009 | Cittadino | A47K 10/3612 242/563 |
| 2010/0163573 | A1 * | 7/2010 | Wegelin | G05B 15/02 222/325 |
| 2011/0035604 | A1 * | 2/2011 | Habraken | G07F 7/1016 235/382 |
| 2011/0050391 | A1 * | 3/2011 | Denison | G07C 9/00912 340/5.51 |
| 2011/0079652 | A1 * | 4/2011 | Bass | G06Q 10/087 235/487 |
| 2011/0264568 | A1 * | 10/2011 | Kim | G06Q 20/208 705/30 |
| 2012/0062382 | A1 * | 3/2012 | Taneff | G08B 21/245 340/573.1 |
| 2012/0112906 | A1 * | 5/2012 | Borke | G16H 40/20 340/539.13 |
| 2012/0194338 | A1 * | 8/2012 | Snodgrass | G08B 21/245 340/539.12 |
| 2013/0187756 | A1 * | 7/2013 | Fisher | G05B 1/00 340/5.61 |
| 2013/0240554 | A1 | 9/2013 | Stråhlin et al. | |
| 2013/0285814 | A1 | 10/2013 | Snodgrass | |
| 2013/0335563 | A1 * | 12/2013 | Jordan | G16H 40/67 348/143 |
| 2015/0312762 | A1 * | 10/2015 | Hernandez | H04W 8/005 455/41.2 |
| 2016/0171811 | A1 * | 6/2016 | Khamphilapanyo | G07F 7/08 700/231 |
| 2016/0224776 | A1 * | 8/2016 | Leow | G06F 21/32 |
| 2017/0134887 | A1 * | 5/2017 | Wegelin | G06Q 10/06 |
| 2017/0213406 | A1 * | 7/2017 | Fares | G07C 9/00309 |
| 2017/0337458 | A1 * | 11/2017 | Ophardt | A47K 5/1202 |
| 2018/0075375 | A1 * | 3/2018 | Becker | G06Q 10/06 |
| 2018/0255981 | A1 * | 9/2018 | Rospierski | G08B 21/245 |
| 2018/0293478 | A1 * | 10/2018 | Cannell | G06K 19/0723 |
| 2018/0308303 | A1 * | 10/2018 | Esposito | G07C 9/27 |
| 2019/0205716 | A1 * | 7/2019 | Moshkovitz | G16H 40/67 |
| 2019/0258997 | A1 | 8/2019 | Williams et al. | |
| 2019/0330891 | A1 * | 10/2019 | Paré | E05C 19/06 |
| 2020/0051363 | A1 * | 2/2020 | Garg | H04W 76/10 |
| 2020/0137570 | A1 * | 4/2020 | Skoda | H04L 63/0861 |
| 2020/0210942 | A1 * | 7/2020 | Li | G06Q 30/02 |
| 2020/0216025 | A1 | 7/2020 | Bourgeios et al. | |
| 2021/0082271 | A1 * | 3/2021 | Mars | H04W 4/80 |
| 2022/0142415 | A1 * | 5/2022 | Rospierski | A47K 5/1217 |
| 2023/0042066 | A1 * | 2/2023 | Liff | G06F 21/88 |
| 2023/0206706 | A1 * | 6/2023 | Schoenfelder | G07C 9/00904 340/5.7 |
| 2023/0214807 | A1 * | 7/2023 | Francis | H04W 4/021 705/16 |
| 2024/0290154 | A1 * | 8/2024 | Scholz | G07C 9/00896 |

FOREIGN PATENT DOCUMENTS

| | | |
|---|---|---|
| DE | 102012105365 A1 | 12/2013 |
| EP | 2821972 A1 | 1/2015 |
| KR | 20160139745 A | 12/2016 |
| KR | 101888543 B1 | 8/2018 |
| KR | 20200057923 A | 5/2020 |

OTHER PUBLICATIONS

Facility Apps, Facility Apps & Ophardt's Smart Washroom Solutions, Facilityapps.com/, https://www.facilityapps.com/en/smart-washroom/, 2020, 9 pages.

Ward, Lighthouse.io is using location technology to track employee movement and generate management data, Startupdaily.net, https://www.startupdaily.net/2017/01/lighthouse-app-bluetooth-beacon-track-platform/, 2017, 5 pages.

Chinese Office Action Corresponding to Application No. 202180095651.1 on Jan. 16, 2026.

* cited by examiner

200

250

500

For Each of a Plurality of Washroom Facilities, Configure One or More Product Dispensers with a Receiver Configured to Interface with a Beacon Device Incorporated into a Key Configured to Unlock the One or More Product Dispensers and Interface with a Monitoring System at a Server System    502

Interface the Receiver Device with a Server System to Transmit the Identity of the Beacon Device to the Server System    504

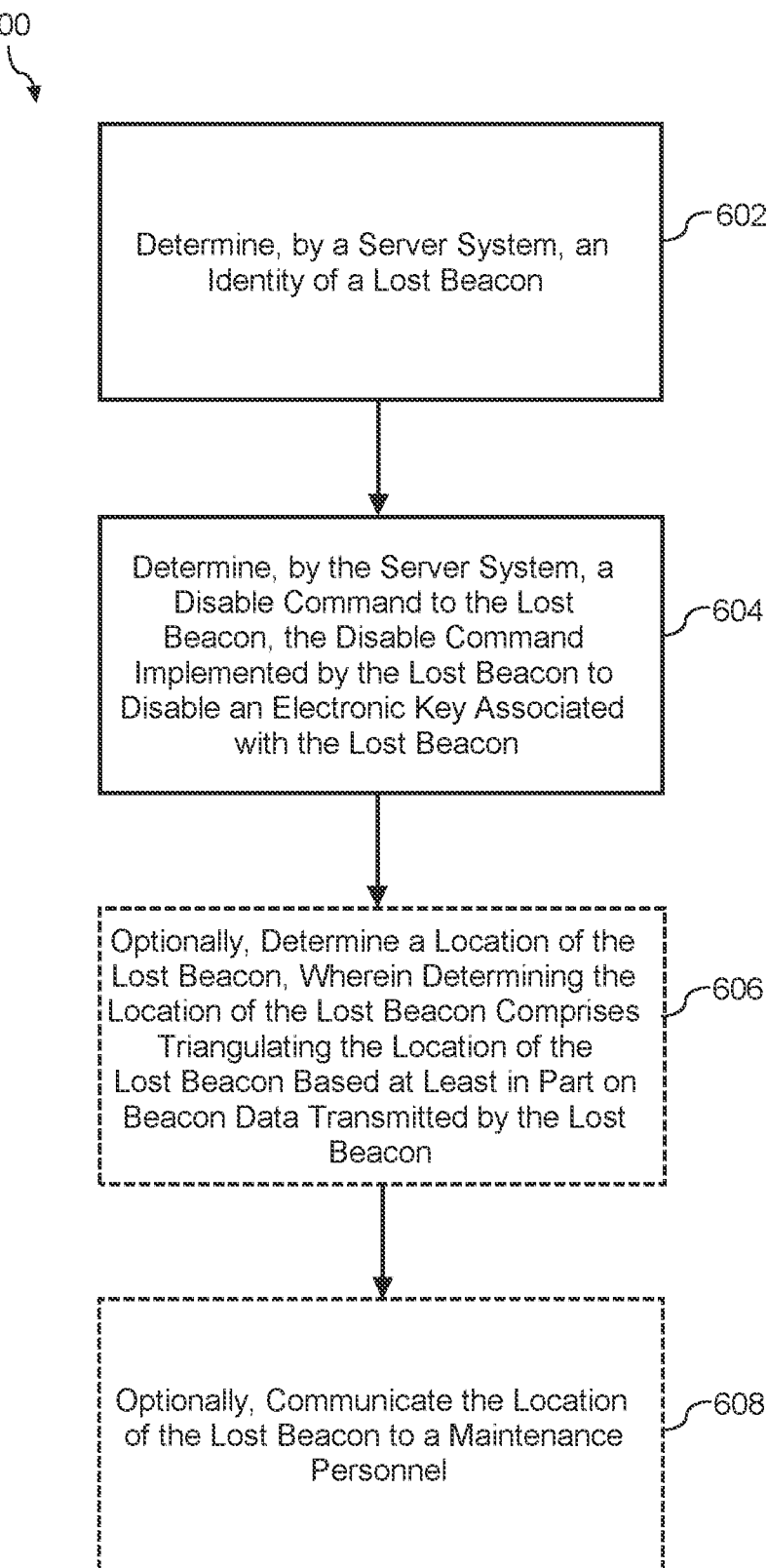

Determine, by a Server System, an Identity of a Lost Beacon

602

Determine, by the Server System, a Disable Command to the Lost Beacon, the Disable Command Implemented by the Lost Beacon to Disable an Electronic Key Associated with the Lost Beacon

604

Optionally, Determine a Location of the Lost Beacon, Wherein Determining the Location of the Lost Beacon Comprises Triangulating the Location of the Lost Beacon Based at Least in Part on Beacon Data Transmitted by the Lost Beacon

606

Optionally, Communicate the Location of the Lost Beacon to a Maintenance Personnel

WIRELESS HANDHELD BEACON DEVICE FOR BUILDING MANAGEMENT

RELATED APPLICATIONS

The present application is the national stage entry of International Patent Application No. PCT/US2021/025052 having a filing date of Mar. 31, 2021, which is incorporated herein in its entirety by reference thereto.

BACKGROUND

Commercial buildings can require various tasks for management, maintenance, and/or upkeep. As one example, washrooms and/or other areas in commercial and residential buildings typically include dispensable or otherwise consumable products such as snack foods, drinks, cleaning supplies, toilet tissue, paper towels, diapers, feminine products, liquid hygiene products such as soap, and aerosol products such as air fresheners. These products are typically housed by a dispenser or other container and are dispensed/consumed as needed by the user. Currently, janitors or maintenance personnel roam the buildings in which they are working to service the building, or the janitors or maintenance personnel are sent to service a particular area (e.g., dispenser) after a problem has occurred or for general maintenance. Improved devices and systems for maintaining dispensers in commercial settings (e.g., restrooms) are needed.

SUMMARY

Aspects and advantages of embodiments of the present disclosure will be set forth in part in the following description, or can be learned from the description, or can be learned through practice of the embodiments.

One example aspect of the present disclosure is directed to a key configured for interfacing with a dispenser in a commercial facility, the key can include a body and key hardware configured to unlock the dispenser. A beacon device can be incorporated into the body. The beacon device can be configured to transmit beacon data including an identity of the beacon device. In some implementations, the key hardware includes physical hardware. In some implementations, the key hardware includes electronic hardware. In some implementations, the beacon device includes a Bluetooth Low Energy beacon. In some implementations, the beacon device includes a beacon controller and an antenna.

Another example aspect of the present disclosure is directed to a method for maintenance of a plurality of commercial facilities by maintenance personnel, wherein each of the commercial facilities has one or more consumable product dispensers that require periodic refill. The method includes interfacing a receiver device incorporated in a product dispenser with a beacon device incorporated into a key configured to unlock the product dispenser, the beacon device configured to periodically emit a beacon signal comprising an identity of the beacon device. The method includes interfacing the receiver device with a server system to transmit the identity of the beacon device to the server system. The method includes identifying, by the server system, an identity of a maintenance personnel that unlocks the product dispenser based at least in part on the identity of the beacon device that is periodically emitted by the beacon device. In some implementations, the key is or includes a mechanical key. In some implementations, the key is or includes an electronic key. In some implementations, the beacon device is additionally configured to act as the electronic key. In some implementations, the method further includes, in response to identifying the identity of the maintenance personnel that unlocks the product dispenser, communicating a service communication to the server system indicating that the product dispenser has been serviced. In some implementations, the service communication includes the identity of the beacon device. In some implementations, the receiver device communicates the service communication to the server system. In some implementations, the identity of the beacon device includes a name of the maintenance personnel. In some implementations, the beacon device includes a Bluetooth Low Energy beacon that emits a unique identifier signal. In some implementations, the server system includes a library of maintenance personnel associated with unique identifier signals such that the identity of the maintenance personnel can be determined based at least in part on a lookup with respect to the unique identifier signal. In some implementations, the beacon device is configured to attach either integrally or removably to the key. In some implementations, the beacon device is provided in a keyring for the key. In some implementations, the method further includes verifying that an identity of the beacon device is on-network prior to interfacing the receiver device with a server system to transmit the identity of the beacon device to the server system.

Another example aspect of the present disclosure is directed to a method for securing a lost beacon device incorporated into a key. The method includes determining a location of the lost beacon, where determining the location of the lost beacon includes triangulating the location of the lost beacon based at least in part on beacon data transmitted by the lost beacon. The method includes communicating the location of the lost beacon to a maintenance personnel. In some implementations, the lost beacon is incorporated into a body of the electronic key.

Other aspects of the present disclosure are directed to various systems, apparatuses, nontransitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

A full and enabling disclosure of the present disclosure is set forth more particularly in the remainder of the specification, including reference to the accompanying figures, in which:

FIG. 5 depicts a block diagram of an example method 500 for maintenance of a plurality of washroom facilities by maintenance personnel, wherein each of the washroom facilities has one or more consumable product dispensers that require periodic refill; and FIG. 6 depicts a block diagram of an example method 600 for securing a lost beacon device incorporated into a key according to example aspects of the present disclosure.

Figure 1:
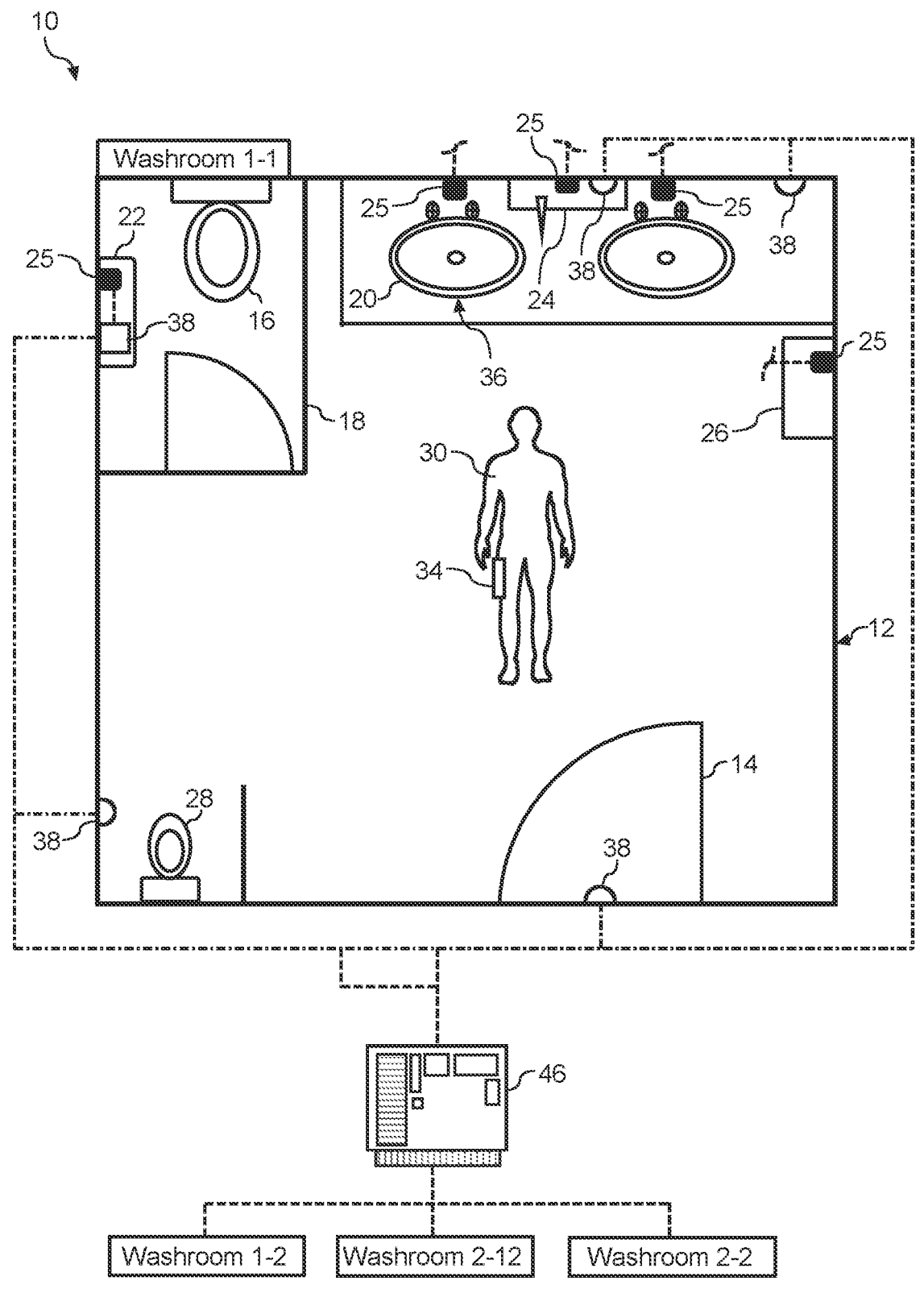
FIG. 1 is a diagram view of a washroom facility incorporating a system and method in accordance with aspects of the present invention.

Repeat use of reference characters in the present specification and drawings is intended to represent the same or analogous features or elements of the present invention.

DETAILED DESCRIPTION

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

The present disclosure is generally directed to a wireless handheld beacon device for building management. For instance, systems and methods according to example aspects of the present disclosure relate to maintenance of commercial facilities, particularly where maintenance personnel are required to periodically refill consumable product dispensers within the facilities, such as paper towel dispensers, soap dispensers, toilet tissue dispensers, and so forth. The maintenance personnel may be members of a janitorial service that has responsibility for upkeep, restocking, and cleanliness of the facilities on a daily basis, or members of a building support staff, and so forth. The beacon device can be carried by maintenance personnel (e.g., janitorial staff) servicing a building, such as a commercial building. The beacon device can include a wireless beacon configured to transmit at least one wireless signal to interact with other wireless devices. In particular, the beacon device can be incorporated into a key for unlocking a dispenser. In this way, the beacon device can be useful for unlocking dispensers for service.

As used herein, a beacon device can be any suitable wireless device that broadcasts a beacon signal (e.g., a Bluetooth Low Energy signal) continuously, intermittently, and/or otherwise expectedly, without direct stimulus from a user of the device. The beacon device can regularly broadcast beacon data, such as an identifier of the beacon device, status information associated with the beacon device, or other suitable beacon data. A receiver device can scan for the beacon data to recognize the presence of the beacon. Upon detecting the beacon data, the receiver device can perform functions such as establishing wireless communications with the beacon device, performing operations based on values of the beacon data, transmitting a signal indicative of recognition of the beacon device and/or information about the beacon device to another computing device, such as a server system, and/or other suitable functions.

For instance, the beacon device can be carried by maintenance personnel as part of a small, portable device that is provided by the janitorial service, building supervisor, or the like, for example in the form of an attachment to a work badge, bracelet, token, dongle, ID card and so forth. In particular, the beacon device may be incorporated with a key or other access device configured to unlock a dispenser for servicing the dispenser. The beacon device may be incorporated into a key in any suitable manner. For instance, the beacon device may be incorporated, (e.g., integrally or removably) into the body of a key directly. Additionally and/or alternatively, the beacon device may be configured to attach to or otherwise connect with the key. Additionally and/or alternatively, the beacon device can be provided at a keychain to which the key is attached. In some implementations, the beacon device may be a mobile phone or incorporated into a wearable device already in use by the maintenance personnel such that the maintenance personnel is not required to keep up with any additional devices.

As an example, the beacon device can be incorporated (e.g., integrally and/or removably) into the base of a mechanical key and/or electromechanical key. Additionally and/or alternatively, the beacon device can function as an electrical key and/or in addition to electrical key functions. For instance, either the beacon signal itself or an additional signal transmitted by a device into which the beacon signal is incorporated can be received by a receiver associated with a dispenser. The receiver, in response to receiving the beacon signal or additional signal, can unlock the dispenser. In the case of an electromechanical key, the dispenser can unlock in response to receiving an electrical signal from the key while the key is additionally interfaced with a mechanical lock. The signal may be received wirelessly and/or (e.g., directly) through the key interface.

In some implementations, the beacon device may be incorporated into the key, but may not necessarily perform functions related to unlocking the dispenser. Even in these implementations, the proximity and relation between the key and the beacon device can provide benefits according to example aspects of the present disclosure. In some implementations, the beacon device is not incorporated into or otherwise related to a smart device, such as a user's smartphone. For instance, the beacon device may be a dedicated key device. In some implementations, the receiver may instead be incorporated into the key and the beacon may be positioned within a commercial facility, such as incorporated into a dispenser or as a stand-alone device.

In some implementations, the beacon device can be used to locate and/or disable a key. For instance, because the beacon device is typically transmitting, even if the beacon device is separated from a user, various network-enabled devices around the building may still receive transmissions from the lost beacon. These transmissions can be used to find the beacon, such as by finding a nearest network enabled device to a beacon, and/or triangulating a position of the beacon, etc. Additionally, because the beacon may still be connected to a server system, the server system can send a disable command to the beacon, which can prevent the beacon from operating (e.g., until it is recovered). This can provide easier handling of lost beacons than conventional systems, as explained further below.

In addition, in some implementations, receiver devices can verify that an identity of the beacon device is on-network prior to interfacing with a server system to transmit the identity of the beacon device to the server system. For instance, receiver devices can access (e.g., from the central server) and/or maintain (e.g., locally) a list of allowed/disallowed beacon devices. For instance, in some implementations, receiver devices can access a whitelist comprising a plurality of beacon device identifier signals corresponding to allowed beacons. When a beacon device identifier signal is received by a receiver device, the identity of the beacon device can be compared to the whitelist. If the identity is present in the whitelist, the receiver device can initiate communications. In contrast, if the identity is not present in the whitelist, the receiver device can ignore communications from the beacon. As another example, the receiver devices can access a blacklist comprising a plurality of beacon identifier signals corresponding to disallowed beacons. If the identity of the beacon device is present in the blacklist, the receiver device can ignore communications. In contrast, if the identity of the beacon device is not present in the blacklist, the receiver device can initiate communications from the beacon. Additionally, the identity may be subject to additional verification steps prior to initiating communications even if not present in the blacklist. For example, the identity may be checked for proper formatting a proper (e.g., Bluetooth Low Energy) prefix, or other additional verification steps.

Incorporating a beacon device into a key according to example aspects of the present disclosure can provide for a number of technical effects and benefits. As a first example, maintenance personnel are already required to carry keys to unlock and service many dispensers. Including the beacon device in a key can reduce a number of articles the maintenance personnel are required to carry and keep up with, resulting in reduced burden on the maintenance personnel. As another example, incorporating a beacon device into a key can provide improved precision of service details, such as providing a more exact time of when the dispenser is serviced and/or how long it took to service the dispenser. Additionally, incorporating the beacon device into a key can provide an alternative to physical keys. As another example, incorporating the beacon device into a key can ensure proximity of the beacon to the dispenser at a point in time at which the dispenser is serviced, which can provide for dispenser-level tracking of service metrics and/or dispenser status.

In addition, incorporating a beacon device into a key according to example aspects of the present disclosure can provide for improved security and tracking of the key and beacon. For instance, in the event that a key is lost, disabling the key can be simplified. For example, in contrast to requiring an update at each device beacon to disable a receiver associated with the user, having the beacon associated with a user allows for the disabling of lost beacons with a single transmission to the beacon, or by a server simply blocking communications with the beacon. In addition, because the beacon device is active and continually transmitting, a lost beacon can be more easily detected and recovered. For instance, other beacon devices, smart devices such as smartphones, and/or other network capable devices in a building can be used to triangulate location of a lost beacon.

As another example incorporating a beacon device into a key, as opposed to a dispenser, can provide for reduced power usage of the dispenser. For instance, the dispenser can instead be outfitted with a receiver, which can have reduced power usage.

Referring to FIG. 1, an embodiment of a system 10 and related method are illustrated with respect to a public or semi-private washroom facility 12 within a building or business site location. The building may have a plurality of similarly configured facilities 12 on one or multiple floors.

The design and features of the washroom facility 12 depicted in FIG. 1 are for illustrative purposes only. The washroom facility 12 is depicted as a men's restroom facility having one or more individual stalls 18 (with individual toilets 16) and one or more urinals 28. A number of sinks 20 are also provided. Any combination of other conventional washroom components may also be provided in the washroom facility 12, such as toilet tissue dispensers 22, soap dispenser 24, towel dispenser 26, and so forth. The individual stalls 18, urinals 28, and sinks 20, may be considered as "functional locations" 36 wherein patrons may perform a desired washroom function within the facility 12. It should be appreciated that any manner of additional functional locations 36 may also be included in the washroom facility 12, such as shower stalls, dressing rooms, infant changing stations, and so forth.

FIG. 1 depicts a maintenance personnel 30 in the washroom facility 12. This person has responsibility for ensuring that the various product dispensers 22, 24, 26 are operable and filled, and for the overall cleanliness of the facility 12.

Within each washroom facility 12, the product dispensers 22, 24, 26 are configured with a sensor 25 that detects a level or amount condition of the product in the dispenser based on any number of operational principles, such as run time of the dispenser or direct measurement of the amount of product dispensed. Numerous types of these product dispensers are well known in the industry and a detailed explanation thereof is not necessary for purposes of the present disclosure. The product dispensers 22, 24, 26 can be in communication with a monitoring system or can be in communication with a server system 46 (as indicated by the dashed lines in FIG. 1) via any manner of suitable wireless communication system (as indicated by the dashed lines in FIG. 1). If used, a monitoring system can include a computer-implemented system that may be remotely located from the washroom facility 12 or configured within the facility 12. The monitoring system may monitor a number of similarly-configured washroom facilities 12 within a building or business site location. As described, with this particular system 10, any one of the dispensers 22, 24, 26 located in the washroom facility 12 can be in direct communication with a system server 46 (also described in greater detail below). Information from the dispensers 22, 24, 26, such as information from the receivers 38 associated with dispensers and/or other receivers 38, may be used by the server system 46 to monitor service status of the dispensers 22, 24, 26 and other locations of the respective washroom facility 12.

Referring to FIG. 1, to carry out the steps discussed above, the washroom facility 12 is configured with one or more receivers 38 strategically located throughout the facility. Each maintenance personnel 30 is provided with a beacon device 34 that transmits a beacon signal that is unique to the particular person 30 (e.g., by being unique to beacon device 34) and is received by one or more of the receivers 38 depending on the person's location within the facility 12. In this manner, as explained in greater detail below, the system 10 (in particular, the server system 46) is able to differentiate between personnel 30 that enter the facility 12.

The beacon device 34 carried by the maintenance personnel 30 may be small, portable device that are provided by the janitorial service, building supervisor, or the like, for example in the form of an attachment to a key and so forth. In particular, as indicated in FIG. 1, the beacon device 34 may be incorporated with a key or other access device configured to unlock a dispenser for servicing the dispenser. As an example, the beacon device 34 can be incorporated into the base of a mechanical key and/or electromechanical key. Additionally and/or alternatively, the beacon device 34 can function as an electrical key and/or in addition to electrical key functions. For instance, either the ID signal itself or an additional signal transmitted by a device into which the beacon signal is incorporated can be received by a receiver associated with a dispenser. The receiver, in response to receiving the beacon signal or additional signal, can unlock the dispenser. In the case of an electromechanical key, the dispenser can unlock in response to receiving an electrical signal from the key while the key is additionally interfaced with a lock.

In the embodiment illustrated in FIG. 1, the washroom facility 14 includes a receiver 38 positioned above or near the entrance or door 14 to the facility 12. At this location, the receiver 38 is used to detect the maintenance personnel 30 as they enter the facility 12. Respective receivers 38 may also located at the various functional locations 36 within the washroom facility 12 to initiate functions of the beacon targeted to locations. The receivers 38 can, more particularly, be incorporated within dispensers 22, 24, 26, within the facility 12 such that when the receiver 38 detects a maintenance personnel, that is a strong indication that the dispenser 22, 24, 26 is being or has been serviced. For example, if the receiver 38 located near the sinks 20 or within dispensers 22, 24, 26 detects a maintenance personnel 30 (e.g., for a defined period of time) based on transmissions from the beacon device 34, the toilet paper dispenser 22, soap dispenser 24, or paper towel dispenser 26 may be unlocked, may be marked as serviced, may communicate instructions to the maintenance personnel 30, and/or perform other suitable operations. As another example, the receivers 38 may be directly mounted to or otherwise incorporated into a respective dispenser. For instance, in response to communicating with a receiver 38, the beacon device 34 and/or receiver 38 may transmit to the server system 46 a service transmission indicating that a respective dispenser has been serviced, along with information such as the identity of the beacon device 34, the time at which the service was performed, the amount of time the service was performed based on the amount of time the beacon device 34 was in a certain proximity to the receiver 38, etc. In response to receiving the service transmission, the server system 46 can perform operations associated with resolving or resetting a maintenance operation of the device, such as turning off an alert, closing a work order, resetting a service timer, etc.

As mentioned, the maintenance personnel's beacon device 34 (incorporated into a key) will generate and transmit a unique signal received by one of the receivers 38 that will identify the particular maintenance personnel 30 to the server system 46. The receiver 38 transmits all or a portion of the received ID signal from the beacon device 34 to an external computing device, such as the server system 46 and/or a controller, which may tag the signal with the identity and location of the particular washroom facility 12 and receiver 38 before transmitting the signal (which includes a signal generated from the ID signal) to the server system 46.

The server system 46 is in communication with the receivers 38 and/or dispensers 22, 24, 26 and includes a memory with a respective file associated with each of the unique beacon signals, wherein the system 46 retrieves or opens the stored file associated with the unique beacon signal to identify a maintenance personnel that is servicing the dispensers 22, 24, 26. Additionally, the server system 46 may include in the memory an association between a receiver 38 and a particular dispenser and/or region within facility 12. In this way, the server system 46 can recognize, upon receiving a service message from a receiver 38, which maintenance personnel has serviced the dispenser, which dispenser has been serviced and/or additional information such as service start time, service stop time, service duration, sensor levels, etc. from the receiver 38 and/or the server system 46.

The beacon device 34 carried by the maintenance personnel 30 can include low-power devices having a defined limited transmit range such that the maintenance personnel 30 must be relatively close to a receiver 38 to be detected. For example, as the maintenance personnel 30 enters the facility 12, the receiver 38 above the door 14 will detect the maintenance personnel's beacon device 34, and the maintenance personnel 30 is automatically identified by the server system 46 upon entering the facility 12.

As discussed with respect to FIG. 1, each of the washroom facilities 12 is equipped with wireless communication capability between the receivers 38 and the beacon devices 34 carried by the respective maintenance personnel 30, wherein an intermittently transmitted data packet (i.e., unique beacon signal) is transmitted and received within a limited range. In this regard, the washroom facilities 12 are considered to be "communication-enabled" facilities. It has been found that Bluetooth Low Energy technology is particularly well-suited for purposes of systems 10 in accordance with the present subject matter. For example, the beacon devices 34 carried by the maintenance personnel 30 may be Bluetooth Low Energy beacons that transmit the unique beacon signal as a Bluetooth Low Energy formatted signal, and the receivers 38 are Bluetooth Low Energy scanners configured to receive and recognize the Bluetooth Low Energy formatted signal.

Bluetooth Low Energy beacons are commercially available and are relatively small devices that can be disguised as a "trinket" that is worn or carried by the maintenance personnel 30. For example, the Bluetooth Low Energy beacon may be a bracelet (e.g., similar to a medical alert bracelet), a component of an identification badge worn by company employees, a decorative or functional item attached to a person's belt or clothes, all of which can be examples of electronic keys, and/or a mechanical key, and/or a keyring, and/or an attachment to an existing key, etc.

Bluetooth Low Energy devices are well-known to those skilled in the art, and a detailed explanation of their function and operation is not necessary for an understanding and appreciation of the present invention. Briefly, Bluetooth Low Energy beacons are a class of low-energy, low-cost radio transmitters that can alert and/or notify a receiver running Bluetooth Low Energy applications of their presence, which in turn enables the receiver to perform certain actions when in close proximity to the beacon. Each Bluetooth Low Energy beacon broadcasts a unique beacon signal using the Bluetooth Low Energy standard format. These unique signals are also known as beacon "advertisements." The Bluetooth Low Energy receiver runs an application that enables the device to scan for and receive the signals within transmitting range of the Bluetooth Low Energy beacons. The receiver will automatically "react" to the received signal and may start other Bluetooth Low Energy-enabled applications for various purposes, including communication with a central server, which in this case is the server system 46.

A typical use of Bluetooth Low Energy technology is relatively precise indoor geo-location ("micro-location"). A Bluetooth Low Energy-enabled application on the receiver is notified when the Bluetooth Low Energy beacon (beacon device 34) moves out of range of the receiver, and thus is able to determine distance of the beacon device 34 (and thus the maintenance personnel 30) from the receiver 38. The exact geo-location of the receiver 38 is known, and thus the exact location of the beacon device 34 is calculated based on relative distance from the receiver 38 as a function of signal strength. With this location information, the server system 46 in communication with the receivers 38 can identify a dispenser that has been serviced based on location of the personnel 30 within a washroom facility 12 (e.g., by reacting with a receiver 38 located within a particular dispenser).

It should be appreciated that the present systems and methods are not limited to Bluetooth Low Energy technology. The beacon device, the receiver, and/or other wireless devices can implement any suitable wireless protocol to perform wireless communications as described herein. As examples, the wireless protocol can include, but is not limited to, Long Range (LoRa), Near Field Communication (NFC), High-Frequency (HF) RFID, Ultra-High Frequency (UHF) RFID, Ultra-wideband (UWB), Institute of Electrical and Electronics Engineers (IEEE) 802.15.4, Thread, Zigbee, Wirepass, Encoean/ISO/IEC 14543.3.1x, WiFi or IEEE 802.11, cellular services (e.g., 4G Long-Term Evolution (LTE), 5G, etc.), NarrowBand-Internet of Things (NB-IoT), or any other suitable wireless protocols. Other communication technologies are also within the scope and spirit of the disclosure.

As mentioned, certain embodiments will have multiple washroom facilities 12 within a single building or multiple buildings linked to one or more server systems 46 (e.g., a central server system) with each product dispenser and receiver 38 within the multiple of washroom facilities 12 in communication with the server systems 46. In this regard, a communications network is configured for these functions, wherein the individual dispensers are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected and/or multiplexed to the network via the direct network links. Further, the direct network links may represent secure communications channels physically hardened against tampering and/or the communications may be encrypted to prevent unauthorized access to information transmitted thereon.

The server system 46 may include a host computer, which may be an integrated server, or include any manner of periphery server or other hardware structure. The server system 46 may be a single networked computer, or a series of interconnected computers having access to the network via a gateway or other known networking system. Generally, the server system 46 may include a central controller configured to manage, execute and control the individual terminal dispenser units. The server system 46 may include a memory for storing reward program procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The server system 46 may be directly or indirectly connected through the I/O bus to any manner of peripheral devices such as storage devices, wireless adaptors, printers, and the like. In addition, a database (DB) may be communicatively connected to the server system and provide a data repository for the storage and correlation of information gathered from the individual dispenser units, receivers, display devices, or nodes of such devices.

It should be appreciated that the network-enabled devices (e.g., the individual dispenser units) may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The server system 46 may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single business establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

Figure 2A:
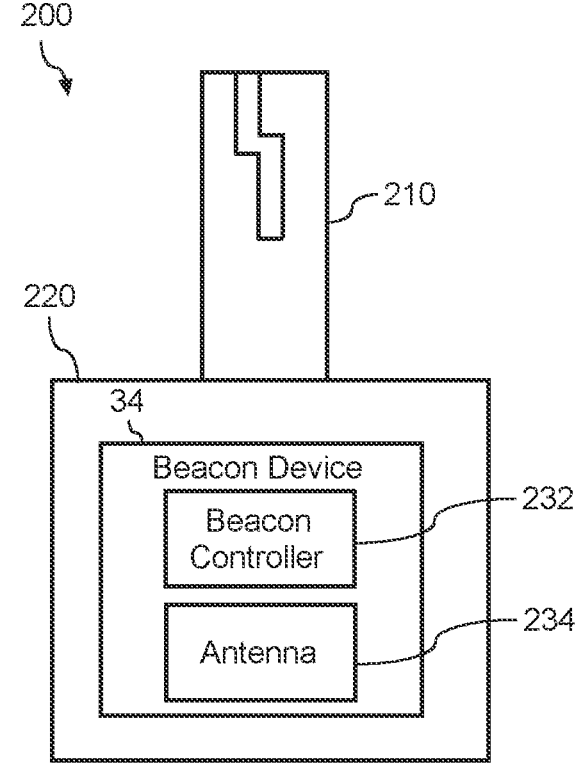
FIG. 2A is block diagram of an example key incorporating a beacon device in accordance with aspects of the present invention.

FIG. 2A is a block diagram of an example key 200 having a beacon device 34 incorporated therein according to example aspects of the present disclosure. The key 200 can be a mechanical key including key hardware 210 and body 220. The key hardware 210 can be configured to interface with a respective lock mechanism at a dispenser to unlock the dispenser. The key hardware can be any suitable hardware. Furthermore, beacon device 34 can be incorporated into the body 220 of the key 200. The beacon device 34 can be configured to transmit beacon data. For instance, the beacon device 34 can include beacon controller 232, which can perform operations for preparing and transmitting the beacon data. Additionally, the beacon device 34 can include antenna 234, which can be energized to broadcast the beacon data.

Figure 2B:
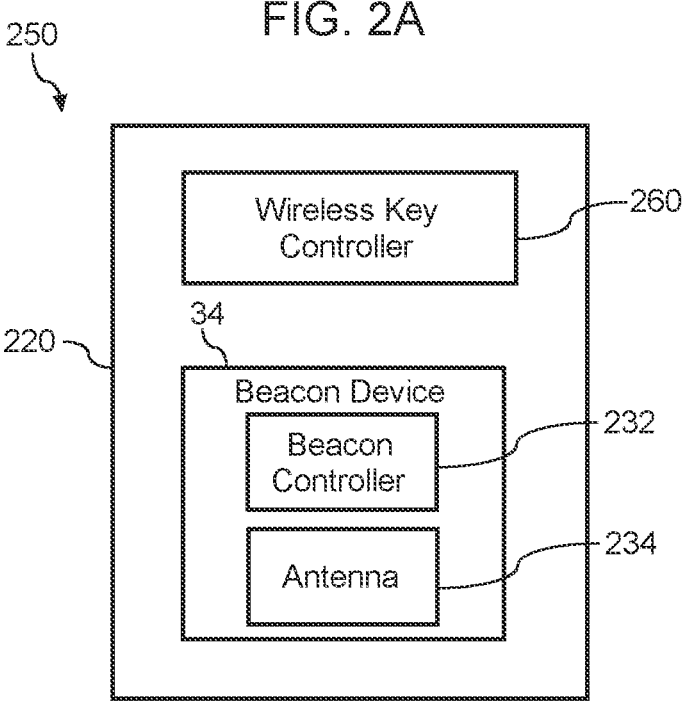
FIG. 2B is block diagram of an example key incorporating a beacon device in accordance with aspects of the present invention.

FIG. 2B is a block diagram of an example key 250 having a beacon device 34 incorporated therein according to example aspects of the present disclosure. Similar to the key 200 of FIG. 2A, the key 250 can include beacon device 34 incorporated into a body 220 of the key 250. However, the key 250 is an electrical key including wireless key controller 260 in place of key hardware 210. The wireless key controller 260 can be configured to perform operations related to electronically unlocking a dispenser. For instance, the wireless key controller 260 can transmit (e.g., via antenna 234 or other suitable antenna) an identifier signal that can serve to unlock a dispenser when received by a suitably configured dispenser. The beacon device 34 can include a beacon controller 232 suitable for performing operations for preparing and transmitting beacon data.

Figure 3:
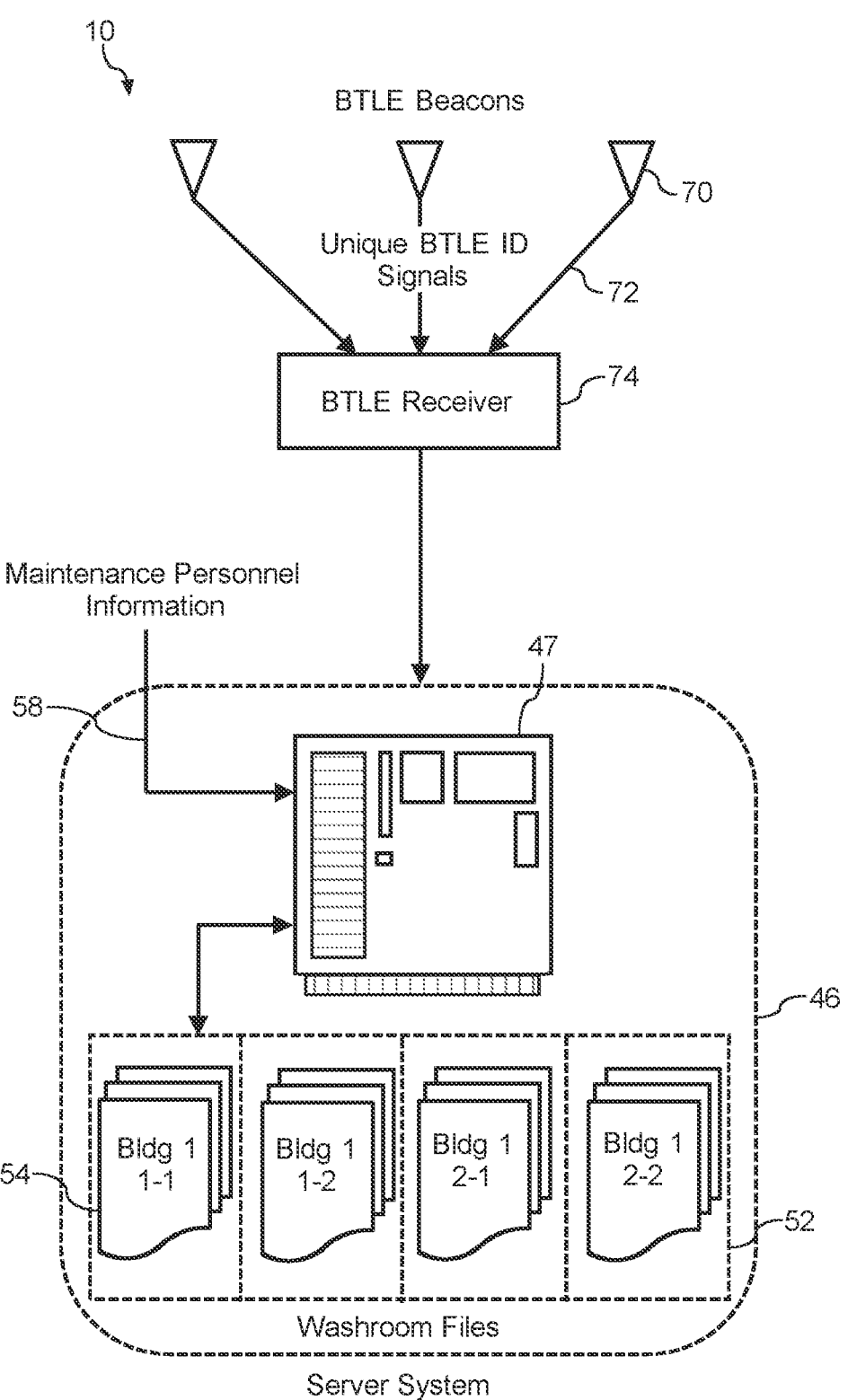
FIG. 3 is a component diagram view of certain control features of a system and method in accordance with the invention.

FIG. 3 is a schematic illustration of certain control aspects of a system 10 in accordance with the invention. In this particular system 10, the server system 46 includes any manner of computer-implemented server 47. The system 46 includes a library 52 in which the washroom facility files 54 are stored. Each file 54 is associated with a particular washroom facility that is also identified in the transmission of the unique Bluetooth Low Energy signal 72 generated by a Bluetooth Low Energy beacon 70 to the system server 46. As discussed above, the Bluetooth Low Energy beacons 70 are an embodiment of a beacon device 34 carried by the individual maintenance personnel 30 that visits a washroom facility 12 equipped with the system 10. The unique Bluetooth Low Energy signals 72 are received by a Bluetooth Low Energy enabled receiver 74 located within the washroom facility 12. For instance, the Bluetooth Low Energy enabled receivers 74 can be an embodiment of a receiver 38 as discussed with reference to system 10 in FIG. 1. As discussed above, a single receiver 74 may be associated with each washroom facility 12, or a plurality of different receivers 74 may be located throughout the facility 12, for example at each of the individual functional locations 36 within the facility 12.

Still referring to FIG. 3, the Bluetooth Low Energy receiver 74 transmits all or a portion of the signals 72 (including a signal generated from the signal 72) the to the server system 46 (e.g., directly, via one or more intermediate devices such as a hub, controller, etc.) while also identifying the particular washroom facility 12 and/or receiver 74 and/or maintenance personnel (e.g., 30) in/for which the signals 72 were generated. FIG. 3 depicts a number of inputs 58 to the server system 46. For example, one of the inputs 58 labeled "Maintenance Personnel information" may relate to personalized information for each personnel 30, such as name, job schedule, facility responsibilities, and so forth. Another input relates to washroom information, such as special events, historical product usage, cleaning/refill schedules, complaints/comments regarding particular washrooms, types of dispensers in the washroom, and so forth. These inputs 58 may be stored at the server system 46.

Figure 4:
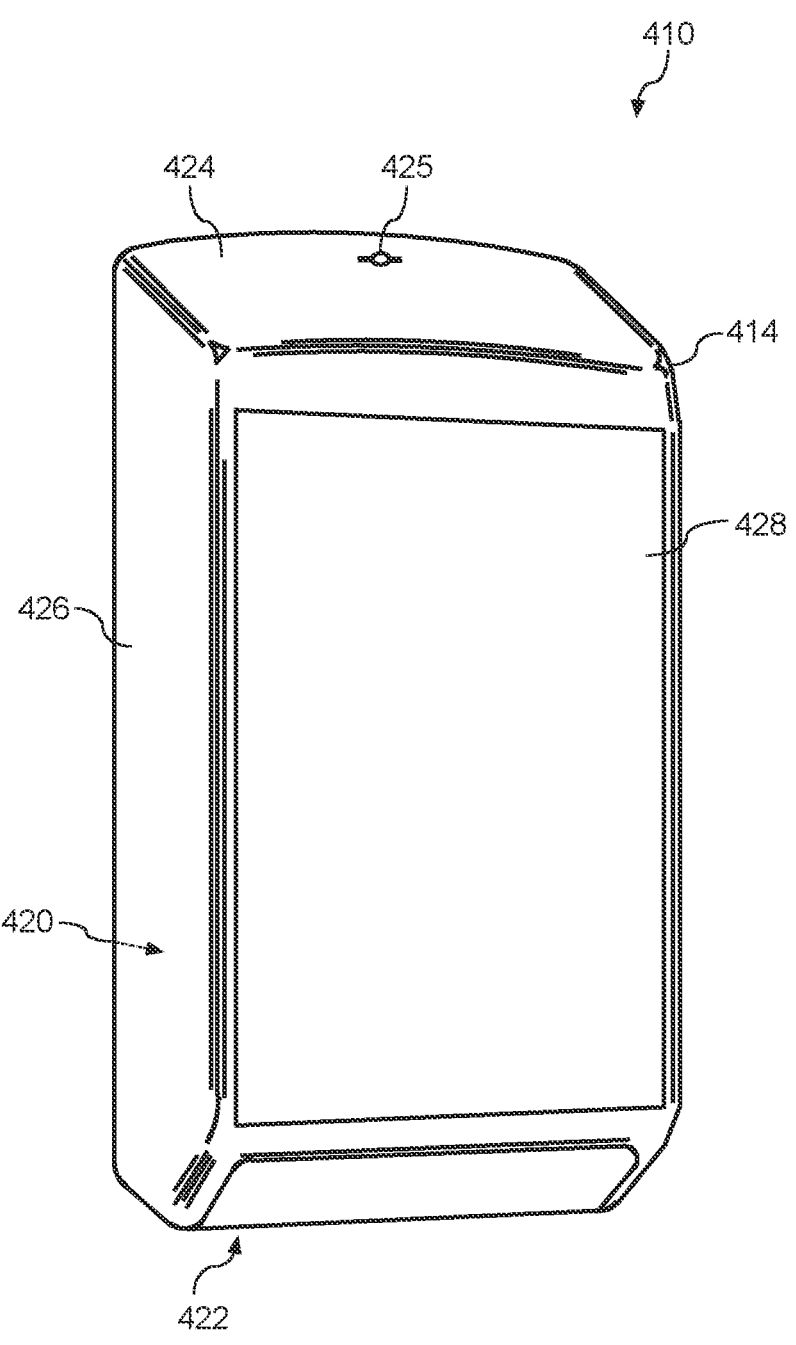
FIG. 4 depicts a perspective view of one embodiment of a dispenser with its front cover in an closed position according to example embodiments of the present disclosure.

Referring now to FIG. 4, a dispenser 410 according to example embodiments of the present disclosure is illustrated. The dispenser 410, as shown, is configured for dispensing paper products, such as stacked folded individual sheets of paper towels or sheets of rolled paper products, such as paper towels, toilet paper, and/or toilet tissue. The dispenser 410 is particularly suited for dispensing paper towels, tissues, and the like. However, it should be appreciated that a dispenser according to the disclosure is not limited in this regard. Indeed, the dispensers disclosed herein can refer to a paper product dispenser and/or a liquid product dispenser. Dispensers described herein can include in-counter mounted product dispensers, wall-mounted product dispensers, including dispensers mounted to the walls of bathroom stalls, and/or stand-alone product dispensers.

The dispenser will be described herein as it relates to a paper towel dispenser for clarity and ease of explanation. It should also be appreciated that a dispenser according to the disclosure is not limited in its overall shape or configuration. This particular dispenser is illustrated merely as an example of one embodiment of a dispenser incorporating the unique features of the present disclosure.

The dispenser 410 includes a housing 414 that is configured to hold a supply of paper product in an internal storage space 420 defined within the housing 414. The housing 414 may be formed of any suitable materials. The cover 424 is attached to the stationary components of the housing 414, and is movable to an open position wherein access is provided to the internal storage space 420 for loading additional products. The cover 424 can also include side panels 426. The cover 424 is shown in its closed position in FIG. 4 wherein the cover defines a front panel 428 of the dispenser 410. The cover 424 is releasably engaged with the stationary components of the housing by way of any locking device 425. The locking device 425 can include a conventional mechanical locking device or can include a combination electro-mechanical locking device. The cover 424 may be pivotally attached to a stationary component of the housing 414. For example, the cover 424 can pivotally attached by way of pivotal mounts. Any conventional pivotal attaching mechanism may be used in this regard. For example, in certain embodiments, a simple rotatable rod is provided and retained by rod holders. It should be appreciated that any number of conventional pivotal arrangements are known by those skilled in the art that may be utilized to pivotally mount the cover member 424.

The housing 414 includes at least one dispensing opening 422 through which the paper product is dispensed from the internal storage space 420. In the illustrated embodiment, the dispensing opening 422 is defined in the bottom the housing 414. However, the dispensing opening 422 could be located anywhere convenient for the dispensing of suitable product. For example, the dispensing opening 422 could also be defined in a bottom portion or panel member of the cover 424. The dispensing opening 422 may be disposed in any convenient location for a user to pull and dispense the individual folded sheets from the housing 414.

The dispenser can include any number of operational components housed in the housing 414 and/or located external to the housing 414. Suitable operational components can vary depending on the type of dispenser and product to be dispensed. For example, the operational components of the dispenser 410 can be mounted directly to the back panel of the housing 414 or can be part of a module that is received within the housing 414. For example, the operational components can be part of a module that may be readily removable from the housing 414 for servicing and/or replacing components without the necessity of having to remove the entire dispenser 410 from its support surface. For dispensing paper products, such as one or more rolls of sheet material, the operational components can include rollers, such as pressure rollers, drive rollers, drive motors, gear assemblies, and control circuitry, including, for example, controllers or microprocessors, for driving paper product from the roll of sheet material out through a dispensing opening. Additional roll holders, including main roll holders and stub roll holders, can also be included in the dispenser. Additional transfer mechanisms may also be present in order to transfer dispensing between a stub roll and a main roll. Such components are known by those of skill in the art and can be incorporated accordingly herein. Additionally, tear bars or cutting bars may be present in order to cut the paper product as it is dispensed from the dispensing material. In certain embodiments, the dispenser can be configured to dispense a particular amount of sheet material. Dispensing mechanisms can be powered by batteries in a battery component or can be powered by an AC to DC distribution system.

In certain embodiments, the dispenser can be configured as a liquid product dispenser. Liquid product dispensers are suitable for dispensing a liquid product, such as hand soap, hand sanitizer, or other personal care products. While the term "liquid product" is used, the disclosure is not so limited. Indeed, the product dispensed could be a viscous liquid, such as hand soap, or a foam product, such as foamed hand soap. The disclosure is intended to cover a variety of liquid products that can be dispensed in a viscous or foamed state. Liquid product dispensers can include a variety of features and operational components including delivery spouts, motors, motor housings, pump devices, electronic sensors, control circuitry, liquid product reservoirs, delivery tubes, power supply housings, electrical contacts, battery compartments, and combinations thereof.

As disclosed, in embodiments, the dispensers can include controllers and control circuitry. The controller and control circuitry can control and monitor all the functions of the dispenser including the length of the sheet of material being dispensed, product usage, and any other activities that are occurring within the dispenser. The control circuitry can be configured to communicate information regarding the dispenser to a server system (e.g., a cloud-based management service) via wired means or through a web-based system as described more particularly herein. For instance, the control circuitry can include a receiver configured to interface with a beacon device.

In one embodiment, the dispenser can include a sensor that is designed to detect the presence of a user in a detection zone. Once the presence of a user is detected, the dispenser can be configured to automatically dispense the product, such as a sheet product or liquid product.

FIG. 5 depicts a block diagram of an example method 500 for maintenance of a plurality of washroom facilities by maintenance personnel, wherein each of the washroom facilities has one or more consumable product dispensers that require periodic refill. For instance, the method 500 can be implemented to manage washroom facility 12 of FIG. 1.

At 502, the method 500 can include interfacing a receiver device incorporated in and/or in close proximity to a product dispenser with a beacon device incorporated into a key configured to unlock the product dispenser. For instance, the receiver device can receive a beacon signal that is periodically transmitted by the beacon device. For instance, the key can be an electronic key and/or a mechanical key. In some implementations, the beacon device can be configured to act as the electronic key. In some implementations, the beacon device can be a Bluetooth Low Energy beacon that emits a unique identifier signal. The server system can maintain a library of maintenance personnel and associated unique identifier signals such that the identity of the maintenance personnel can be determined based at least in part on a lookup with respect to the unique identifier signal. In some implementations, the beacon device is configured to attach to the key. In some implementations, the beacon device is provided in a keyring for the key.

At 504, the method 500 can include interfacing the receiver device with a server system (e.g., a central server system) to transmit the identity of the beacon device to the server system. For instance, the receiver device can communicate with the server system via any suitable means of electronic communication, such as WiFi, cellular services, wired (e.g., ethernet) connections, etc.

At 506, the method 500 can include identifying a maintenance personnel that unlocks the product dispensers based at least in part on an identity of the beacon device that is periodically transmitted by the beacon device. For instance, in some implementations, in response to identifying the maintenance personnel that unlocks the product dispensers, the method 500 can include communicating a service communication to the server system indicating that the product dispensers have been serviced. In some implementations, the service communication can include the identity of the beacon device. Additionally and/or alternatively, the service communication can include context information about the interaction with the beacon device, such as, for example, time the interaction begins (e.g., corresponding to a service start time), time the interaction ends (e.g., corresponding to a service end time), duration of the interaction, identity of the washroom or facility, identity of the personnel, sensor level information, and/or any other suitable information. The receiver can communicate the service communication to the server system. In some implementations the identity of the beacon device comprises a name of the maintenance personnel.

FIG. 6 depicts a block diagram of an example method 600 for securing a lost beacon device incorporated into a key according to example aspects of the present disclosure. At 602, the method 600 can include determining, by a server system (e.g., a central server), an identity of a lost beacon. For instance, a system administrator or other personnel can indicate that a beacon is lost. For example, a system administrator or other personnel can indicated in one or more files on the server system, that a certain signal ID or components of a signal ID from a particular beacon is lost. The method 600 can then include, at 604, communicating, by the server system, a disable command to the lost beacon. The disable command can be implemented by the lost beacon to disable an electronic key associated with the lost beacon. As an example, the disable command can be communicated to a lost key if the key ever returns within proximity of a receiver or other communications-enabled device on the network. For instance, the lost beacon can be incorporated into a body of the electronic key. The disable command can stop the electronic key from transmitting an unlock signal. The method 600 can optionally include, at 606, determining a location of the lost beacon, wherein determining the location of the lost beacon can include triangulating the location of the lost beacon based at least in part on beacon data transmitted by the lost beacon. The method 600 can then optionally include, at 608, communicating the location of the lost beacon to a maintenance personnel. For instance, the location of the lost beacon can be communicated such that the maintenance personnel can recover the beacon.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A key for interfacing with a dispenser in a commercial facility, the key comprising:

a body;

key hardware configured to unlock the dispenser, the key hardware comprising physical hardware; and a beacon device comprising a Bluetooth Low Energy beacon incorporated into the body, the beacon device configured to transmit beacon data comprising an identity and precise indoor geo-location of the beacon device;

wherein the key is configured to communicate with a receiver located within the dispenser to identify that the dispenser has been serviced based on the identity and the precise indoor geo-location of the beacon device within the commercial facility; and wherein the dispenser comprises a toilet tissue dispenser, a soap dispenser, and/or a towel dispenser.

2. The key of claim 1, wherein the key hardware comprises electronic hardware.

3. The key of claim 1, wherein the beacon device is configured to implement a wireless protocol to transmit the beacon data, wherein the wireless protocol comprises at least one of: Long Range (LoRa), Near Field Communication (NFC), High-Frequency (HF) RFID, Ultra-High Frequency (UHF) RFID, Ultra-wideband (UWB), Institute of Electrical and Electronics Engineers (IEEE) 802.15.4, Thread, Zigbee, or Wirepass.

4. The key of claim 1, wherein the beacon device comprises a beacon controller and an antenna.

5. A method for maintenance of a plurality of commercial facilities by maintenance personnel, wherein each of the commercial facilities has one or more consumable product dispensers that require periodic refill, the method comprising:

interfacing a receiver device incorporated in a product dispenser with a beacon device comprising a Bluetooth Low Energy beacon incorporated into a key configured to unlock the product dispenser, the beacon device configured to periodically emit a beacon signal comprising an identity of the beacon device, the key comprising a mechanical key;

interfacing the receiver device with a server system to transmit the identity and precise indoor geo-location of the beacon device to the server system; and identifying, by the server system, an identity of a maintenance personnel that unlocks the product dispenser based at least in part on the identity of the beacon device that is periodically emitted by the beacon device;

wherein the server is configured to identify that the dispenser has been serviced based on the identity and the precise indoor geo-location of the beacon device within the commercial facility;

wherein the one or more consumable product dispensers comprise a toilet tissue dispenser, a soap dispenser, and/or a towel dispenser.

6. The method of claim 5, wherein the key comprises an electronic key.

7. The method of claim 6, wherein the beacon device is additionally configured to act as the electronic key.

8. The method of claim 5, further comprising:

in response to identifying the identity of the maintenance personnel that unlocks the product dispenser, communicating a service communication to the server system indicating that the product dispenser has been serviced.

9. The method of claim 8, wherein the service communication comprises the identity of the beacon device.

10. The method of claim 8, wherein the receiver device communicates the service communication to the server system.

11. The method of claim 5, wherein the identity of the beacon device comprises a name of the maintenance personnel.

12. The method of claim 5, wherein the beacon device emits a unique identifier signal.

13. The method of claim 12, wherein the server system comprises a library of maintenance personnel associated with unique identifier signals such that the identity of the maintenance personnel can be determined based at least in part on a lookup with respect to the unique identifier signal.

14. The method of claim 5, wherein the beacon device is configured to attach either integrally or removably to the key.

15. The method of claim 5, wherein the method further comprises verifying that an identity of the beacon device is on-network prior to interfacing the receiver device with a server system to transmit the identity of the beacon device to the server system.

\*   \*   \*   \*   \*